United States Patent
Marupaduga et al.

(10) Patent No.: US 11,064,442 B1
(45) Date of Patent: Jul. 13, 2021

(54) UPLINK CHANNEL POWER MANAGEMENT IN DUAL CONNECTIVITY DEVICES

(71) Applicant: T-MOBILE INNOVATIONS LLC, Overland Park, KS (US)

(72) Inventors: Sreekar Marupaduga, Overland Park, KS (US); Rajveen Narendran, Olathe, KS (US); Ravi Kallepalli, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 16/748,432

(22) Filed: Jan. 21, 2020

(51) Int. Cl.
*H04W 52/14* (2009.01)
*H04W 52/36* (2009.01)

(52) U.S. Cl.
CPC ....... *H04W 52/146* (2013.01); *H04W 52/367* (2013.01)

(58) Field of Classification Search
CPC . H04W 52/146; H04W 52/367; H04W 52/30; H04W 52/32; H04W 52/322; H04W 52/34; H04W 52/346
See application file for complete search history.

(56) References Cited

U.S. PATENT DOCUMENTS

| | | | | |
|---|---|---|---|---|
| 8,355,747 B1* | 1/2013 | West | ..................... | H04W 76/15 455/552.1 |
| 8,619,676 B2* | 12/2013 | Zheng | .................. | H04B 7/0671 370/328 |
| 9,876,618 B2* | 1/2018 | Heo | ........................ | H04L 5/001 |
| 2003/0026219 A1* | 2/2003 | Moon | .................. | H04W 52/322 370/318 |
| 2004/0114546 A1* | 6/2004 | Seshadri | ................. | H04L 69/40 370/310.2 |
| 2005/0176437 A1* | 8/2005 | Mir | ....................... | H04W 56/00 455/450 |
| 2011/0053631 A1* | 3/2011 | Bottomley | ............ | H04W 52/08 455/522 |
| 2011/0275335 A1* | 11/2011 | Luo | ..................... | H04W 52/281 455/127.1 |
| 2014/0064186 A1* | 3/2014 | Grant | .................. | H04W 52/325 370/328 |
| 2014/0295909 A1* | 10/2014 | Ouchi | ................... | H04W 52/40 455/522 |
| 2015/0282093 A1* | 10/2015 | Kaukovuori | .......... | H04W 24/10 370/311 |
| 2016/0088573 A1* | 3/2016 | Xue | .................... | H04W 52/243 370/252 |
| 2016/0157184 A1* | 6/2016 | Wang | .................... | H04L 5/0055 370/329 |
| 2016/0174428 P1* | 6/2016 | Wit | .............................. | Plt./162 |

(Continued)

*Primary Examiner* — Dominic E Rego

(57) ABSTRACT

Systems and methods are provided for dynamically is provided for dynamically modifying the per-channel maximum transmit power limits of a user device using E-Utran/New Radio Dual Connectivity (ENDC) to communicate with a wireless communications network. Uplink channel grants and maximum total transmit power of the user device are determined. The power headroom of un-granted uplink channels is re-allocated to granted uplink channels, allowing the ENDC user device to more efficiently utilize the user device's maximum total transmit power to communicate with the wireless communications network.

20 Claims, 5 Drawing Sheets

(56) References Cited

U.S. PATENT DOCUMENTS

| | | | |
|---|---|---|---|
| 2016/0198418 A1* | 7/2016 | Ishikura | H04W 52/225 |
| | | | 455/522 |
| 2017/0303289 A1* | 10/2017 | Guo | H04W 52/367 |
| 2018/0007729 A1* | 1/2018 | Koshta | H04W 76/18 |
| 2018/0014259 A1* | 1/2018 | Yang | H04W 52/34 |
| 2018/0042012 A1* | 2/2018 | Yerramalli | H04W 72/0446 |
| 2018/0176938 A1* | 6/2018 | Shao | H04W 52/346 |
| 2018/0206258 A1* | 7/2018 | Hosseini | H04W 72/1268 |
| 2019/0174428 A1* | 6/2019 | Shao | H04W 52/281 |
| 2019/0342839 A1* | 11/2019 | Shao | H04L 1/1861 |
| 2020/0022097 A1* | 1/2020 | Wang | H04W 52/367 |
| 2020/0163024 A1* | 5/2020 | Li | H04W 52/38 |
| 2020/0214044 A1* | 7/2020 | Qian | H04W 74/0833 |
| 2020/0245258 A1* | 7/2020 | Wang | H04W 52/281 |

\* cited by examiner

UPLINK CHANNEL POWER MANAGEMENT IN DUAL CONNECTIVITY DEVICES

The present disclosure is directed, in part, to uplink power control of a user device in a wireless communication network, substantially as shown in and/or described in connection with at least one of the figures, and as set forth more completely in the claims.

According to various aspects of the technology, uplink power with respect to multiple uplink channels used by a user device to communicate with one or more access points of a wireless communications network is dynamically adjusted in order to improve the abilities of the user device. Typically, maximum total uplink power is hard-set for a user device and is equally divided among the one or more transmitters of the user device, which are used to communicate with one or more wireless networks using one or more uplink channels. Further, in some devices, which are configured for E-UTRAN New Radio Dual Connectivity (ENDC), the maximum total uplink power may be different, depending on whether or not ENDC is configured or deconfigured. For example, the maximum total uplink power may be set to 23 dBm if ENDC is configured and may only permit the maximum total uplink power to be increased to 26 dBm if ENDC is deconfigured.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
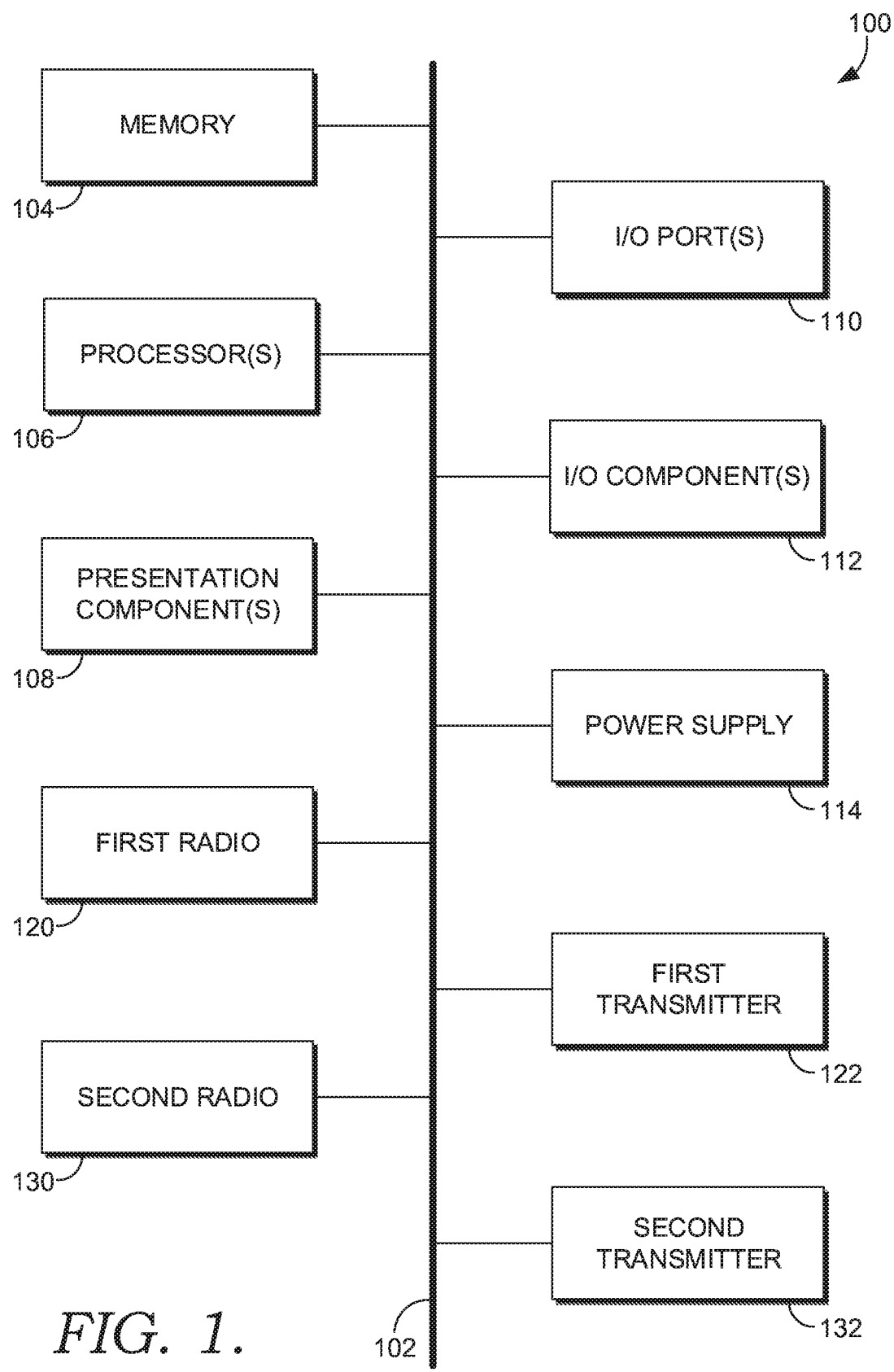
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| CD-ROM | Compact Disk Read Only Memory |
| CDMA | Code Division Multiple Access |
| eNodeB | Evolved Node B |
| GIS | Geographic/Geographical/Geospatial Information System |
| gNodeB | Next Generation Node B |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MIMO | Multiple Input Multiple Output |
| MD | Mobile Device |
| PC | Personal Computer |
| PCS | Personal Communications Service |
| PDA | Personal Digital Assistant |
| RAM | Random Access Memory |
| RET | Remote Electrical Tilt |
| RF | Radio-Frequency |
| RFI | Radio-Frequency Interference |
| R/N | Relay Node |
| RNR | Reverse Noise Rise |
| ROM | Read Only Memory |
| RSRP | Reference Transmission Receive Power |
| RSRQ | Reference Transmission Receive Quality |
| RSSI | Received Transmission Strength Indicator |
| SNR | Transmission-to-Interference-Plus-Noise Ratio |
| SNR | Transmission-to-noise ratio |
| SON | Self-Organizing Networks |
| TDMA | Time Division Multiple Access |
| TXRU | Transceiver (or Transceiver Unit) |
| UE | User Equipment |
| UMTS | Universal Mobile Telecommunications Systems |
| WCD | Wireless Communication Device (interchangeable with UE) |

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless communication network employs one or more base stations to provide wireless access to a network. For example, in a wireless telecommunication network, a plurality of access points, each providing service for a cell or a sector of a cell, are used to transmit and receive wireless signals to/from one or more UEs. An access point may be considered to be one or more otherwise-discrete components comprising an antenna, a radio, and/or a controller, and may be alternatively referred to as a "node," in that it is a point of origin for the communication link between the wired and wireless portions of the communication system. In aspects, an access point may be defined by its ability to communicate with a UE according to a single protocol (e.g., 3G, 4G, LTE, 5G, and the like); however, in other aspects, a single access point may communicate with a UE according to multiple protocols.

Some modern UEs may be configured for E-UTRAN New Radio Dual Connectivity (ENDC). That is, the UE may utilize two or more discrete uplink channels to simultaneously (or nearly-simultaneously) communicate with one or more access points (e.g., a Pcell and an Scell). Generally, a wireless network may utilize ENDC technology to increase the overall throughput for a UE (or the network, for example, in times of high congestion), whether because a greater amount of data payload is divided between each of the two or more connected uplink channels or because utilizing different frequencies to communicate data payloads may experience greater SINR, among other reasons. It will be appreciated that in order for the UE to successfully communicate with the network using ENDC, one or more network components may determine and communicate an uplink channel grant (e.g., a particular time slot in TDD or a particular frequency in FDD) to the UE that serves as a permission for the UE to communicate with the network at a particular time and/or frequency. Such a grant may be originated by the network or may be the result of one or more uplink channel requests received from the UE. For the purposes of this disclosure, it may be assumed that the UE will not attempt to communicate (i.e., will not expend transmission power) on an uplink channel that has not been granted.

Whether set by jurisdictions, carriers, manufacturers, a user, or some other entity, a UE has a maximum total transmit power (e.g., 26 dBm) that cannot be exceeded. Because a UE configured for ENDC needs to allow for uplink transmission power among a plurality of uplink channels, the UE may be programmed (whether by software, firmware, hardware, or a combination thereof) with a particular per-channel maximum transmit power on each potential channel. In what will be referred to herein as the "standard ENDC configuration," a UE may be pre-programmed to equally allocate transmit power based on protocol, and further allocated transmit power based on how many cells are desirable per protocol (e.g., 26 dBm total, equally divided into 23 dBm for 4G and 5G, and wherein it is desirable to connect to two 4G cells, the 4G portion may be further divided into 20 dBm for each of a 4G Pcell and a 4G Scell). While such a configuration prevents the UE from exceeding the maximum total transmit power, the absence of a dynamic power allocation solution may place unnecessary limits on the ability of the UE to communicate with one or more access points by enforcing lower per-channel maximum transmit powers. UEs that are configured for ENDC may have a lower maximum total uplink power and/or a lower channel-specific uplink power available for communicating with one or more access points, particularly when at least one of the potential uplink channels is not being utilized (e.g., if the UE has not received a grant on one or more particular uplink channels). Thus, when one or more potential uplink channels is not being utilized, power headroom may exist that could be utilized to improve the uplink connection of one or more of the in-use uplink channels.

As such, there is a need for a way to optimize per-channel maximum transmit powers of a UE with respect to multiple transmitters as it communicates with, or otherwise exchanges information with, one or more wireless networks. There are several advantages to dynamically modifying the transmission of a user device. For instance, it allows for the optimization of transmitting information between a user device and one or more networks, for example in a dual connectivity device. Further, by modifying the transmission power of a user device with respect to one or more transmitters, the user device can have better uplink performance when connected to a network.

As used herein, the terms "primary cell (Pcell)" and/or "secondary cell (Scell)" may be specific nodes, base stations, or access points, that can be considered to be discrete from one another. While a particular Pcell and/or Scell may be referred to herein with respect to its protocol, it should be understood that any particular Pcell or Scell may be capable of operating in any one or more of any suitable wireless communication protocol. It should also be understood that a Pcell or an Scell may take various operational forms; for example, a Pcell may be a macro cell and an Scell may be a small cell, or vice versa. The terms "user device," "user equipment," "UE," "mobile device," "mobile handset," and "mobile transmitting element" may be used interchangeably in this description.

Accordingly, a first aspect of the present disclosure is directed to a system for dynamically allocating maximum uplink power per channel in a user device. The system may comprise a plurality of access points, wherein each of the plurality of access points are capable of communicating with a user device via a distinct uplink channel. The system may also comprise a processor, wherein the processor is configured to determine that a first set of uplink channels has been granted to the user device. The processor is further configured to determine that a second set of uplink channels has not been granted to the user device. The processor is further configured to determine a maximum total transmit power of the user device, wherein a first amount of the maximum total transmit power is cumulatively allocated to the first set of uplink channels, and wherein a second amount of the maximum total uplink power is cumulatively allocated to the second set of uplink channels. The processor is further configured to instruct the user device to increase the first amount of the maximum total transmit power by the second amount of the maximum total transmit power.

A second aspect of the present disclosure is directed to a method for modifying one or more uplink channel power limits of a user device claim. The method may comprise determining that a first set of uplink channels have been granted to the user device. The method may also comprise determining that a second set of uplink channels have not been granted to the user device. The method may also comprise determining a maximum total transmit power of the user device, wherein a first amount of the maximum total transmit power is cumulatively allocated to the first set of uplink channels, and wherein a second amount of the maximum total transmit power is cumulatively allocated to the second set of uplink channels. The method may also comprise instructing the user device to increase the first amount of the maximum total transmit power by the second amount of the maximum total transmit power.

According to another aspect of the technology described herein, one or more computer-readable media is provided having computer-executable instructions embodied thereon that, when executed, perform a method for dynamically changing a radio state of a user device based on a device property associated with the power of the user device. The method comprises determining that a first set of uplink channels have been granted to the user device. The method may also comprise determining that a second set of uplink channels have not been granted to the user device. The method may also comprise determining a maximum total transmit power of the user device, wherein a first amount of the maximum total transmit power is cumulatively allocated to the first set of uplink channels, and wherein a second amount of the maximum total transmit power is cumulatively allocated to the second set of uplink channels. The method may also comprise instructing the user device to increase the first amount of the maximum total transmit power by the second amount of the maximum total transmit power Yet another aspect of present disclosure is directed to a method for modifying one or more uplink channel power limits of a user device. The method may comprise receiving an indication from a wireless network that a first set of uplink channels have been granted to the user device. The method may further comprise determining a maximum total transmit power of the user device, wherein a first amount of the maximum total transmit power is cumulatively allocated to the first set of uplink channels, and wherein a second amount of the maximum total transmit power is cumulatively allocated to the second set of uplink channels. The method may further comprise increasing the first amount of the maximum total transmit power by the second amount of the maximum total transmit power.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with a wireless telecommunications network. In aspects, the first radio 120 utilizes a first transmitter 122 to communicate with the wireless telecommunications network on a first uplink channel and the second radio 130 utilizes the second transmitter 132 to communicate with the wireless telecommunications network on a second uplink channel. Though two radios are shown, it is expressly conceived that a computing device with a single radio (i.e., the first radio 120 or the second radio 130) could facilitate communication with the wireless telecommunications network via both the first transmitter 122 and the second transmitter 132. It is also expressly conceived that the computing device 100 may have additional radios, which may correspond to additional transmitters, for use with communicating with the wireless network on additional uplink channels. As an example, the computing device have up to three radios and up to three transmitters, each of which may be used to communicate signals from the computing device 100 on a discrete uplink channel (resulting in three uplink channels). Illustrative wireless telecommunications technologies include CDMA, GPRS, TDMA, GSM, and the like. One or both of the first radio 120 and the second radio 130 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
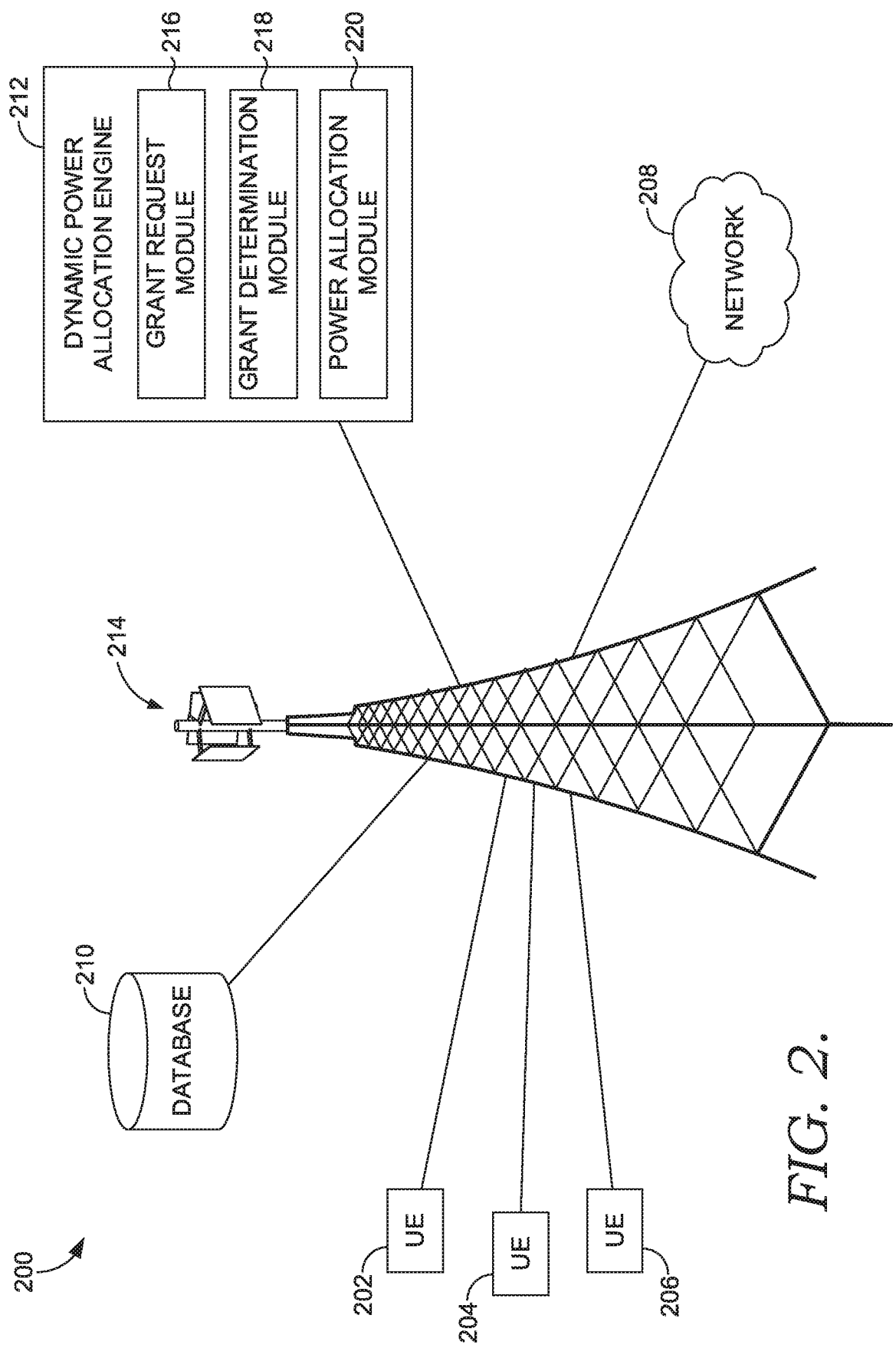
FIG. 2 illustrates a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user devices (items 202, 204, and 206), access point 214 (which may be a cell site, base station, or the like), network 208, database 210, and dynamic power allocation engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, the user devices (items 202, 204, and 206) can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, a user device (items 202, 204, and 206) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the user devices (items 202, 204, and 206) in network environment 200 can optionally utilize network 208 to communicate with other computing devices (e.g., a mobile device(s), a server(s), a personal computer(s), etc.) through access point 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., voice, data, SMS) to user devices, such as user devices 202, 204, and 206. For example, network 208 may provide voice, SMS, and/or data services to user devices or corresponding users that are registered or subscribed to utilize the services provided by a telecommunications provider. Network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with user devices, such as user devices 202, 204, and 206 that are located within the geographical area, or cell, covered by the one or more antennas of access point 214. Access point 214 may include one or more base stations, nodes, base transmitter stations, radios, antennas, antenna arrays, power amplifiers, transmitters/receivers, digital signal processors, control electronics, GPS equipment, and the like. In particular, any one or more of the user devices 202, 204, and 206 may communicate with the access point 214, according to any one or more of a variety of communication protocols, in order to access the network 208. As previously mentioned, in order for a UE to communicate with the network, a component of the network or the UE may originate an uplink grant process. Regardless of what component of environment 200 originates the grant process, an uplink grant is provided to a particular UE to communicate at a particular time and/or frequency in one or more uplink channels.

As shown, access point 214 is in communication with dynamic power allocation engine 212, which comprises various components that are utilized, in various implementations, to perform one or more methods for dynamically adjusting transmit powers on an ENDC-capable UE. In some implementations, dynamic power allocation engine 212 comprises components including a grant request module 216, a grant determination module 28, and a power allocation module 220. However, in other implementations, more or less components than those shown in FIG. 2 may be utilized to carry out aspects of the invention described herein.

The grant request module 216 is generally responsible for receiving uplink grant requests, whether from a UE, such as UE 202, 204, or 206, or from one or more network components. In one aspect, a particular UE may transmit one or more signals to the access point 214 that comprise, or have the effect of triggering, an uplink grant request. The uplink grant request may be node, protocol, cell, time, or frequency specific, or it may be take the form of a general request for an uplink grant for communicating information to the access point 214. For example, a particular UE may initiate a request to one or more network components via the access point 214, wherein the grant request comprises an indication that the UE wishes to communicate according to a particular protocol (e.g., 4G/LTE), on a particular node of a particular cell (e.g., a 4G Pcell). In another aspect, the UE-initiated grant request may simply request any suitable uplink channel grant to be provided to the UE. In such an aspect, the generalized request may comprise (or the network 208 may already be aware of) the communication capabilities of the UE (e.g., the UE is ENDC capable and is already communicating on 2 different 4G uplink channels, meaning that any grant may need to be on a 5G uplink channel). Whether the grant request originates at the UE or by one or more network components, the grant request module 216 receives the request and communicates the request to the network 208 and/or to the grant determination module 218.

The grant determination module 218 is generally responsible for what uplink grants have been allocated to a particular UE. The grant determination module 218 may determine which grant requests should be fulfilled or may determine what grant requests have been fulfilled by another network component, such as network 208. For example, in one aspect, the grant determination module 218 may receive an indication from the grant request module 216 that a UE has requested an uplink grant on a particular uplink channel. In such an aspect, the grand determination module 218 may respond to the grant request by granting a particular time and/or frequency slot on the requested uplink channel to the UE. Alternatively, in an aspect where grant determinations are made remote to the dynamic power allocation engine 212 (e.g., by one or more remote network components on network 208), an indication of the grant instructions may be communicated to the grant determination module 218, which are in turn communicated to the power allocation module 220 in order to make dynamic power allocation decisions.

The power allocation module 220 is generally responsible for making power allocation decisions and/or communicating power allocation decisions/instructions to a particular UE. As with the determination of whether or which uplink channels to grant to a particular UE, the power allocation decisions that affect a UE's channel-specific maximum uplink transmit power may be made by the power allocation module 220 or may be made by one or more remote network components of network 208. In aspects where the power allocation decisions are made by the power allocation module 220, the power allocation module 200 may receive an indication that one or more uplink channels have been granted to a particular UE. The power allocation module 220 may determine, based on one more device or network parameters, a maximum total transmit power (e.g., 26 dBm) of a particular UE (e.g., the first UE 202). Once the maximum total transmit power has been determined, the power allocation module 220 may determine which uplink channels have been granted to the first UE 202. With this information, the power allocation module may allocate the first UE's maximum total transmit power among the uplink channels that have been granted, wherein each uplink channel has a maximum uplink transmit power.

The maximum total transmit power may be equally allocated to each granted uplink channel; however, in other aspects, the maximum total transmit power may be allocated to granted uplink channels based on one or more network parameters (e.g., a UE's physical location, observed SINR, RSRQ, or any other determinable parameter that would impact the ability of the access point 214 to receive an uplink signal from a UE 202, 204, or 206). For example, the first UE 202 may request an uplink grant on three discrete uplink channels: 5G, 4G Pcell, and 4G Scell. The dynamic power allocation engine 212 may determine (or be informed by the network 208) that the first UE 202 is capable of ENDC, that ENDC is not deconfigured on the first UE 202, and that the first UE 202 has a maximum total transmit power of 26 dBm. Based on the information provided by the grant determination module 218, the power allocation module 220 may be aware that the first UE 202 has been given a grant on the 5G and 4G Pcell uplink channels only (the 4G Scell uplink channel may not have been granted for one or more reasons, such as a faulty request, a faulty communication of the request, inadequate/improper permission, etc., or may have been affirmatively rejected) and has been granted an uplink channel to the 4G Pcell and 5G node. In aspects where equal power allocation is desired, the power allocation module may determine that the maximum total transmit power of the first UE 202 should be equally divided between each of the two granted uplink channels. Accordingly, the power allocation module 220 will determine that each of the granted uplink channels may be allocated a maximum transmit power of 23 dBm. As one skilled in the art would appreciate, this may have the effect of increasing the maximum transmit power of the 4G Pcell from 20 dBm (standard ENDC configuration) to 23 dBm, significantly increasing the maximum transmission range of the uplink signal and improving signal quality (e.g., improving uplink SINR).

As mentioned, the power allocation module 220 may allocate per-channel maximum transmit powers based on one or more network parameters. For example, the power allocation module 220 may be provided with one or more network parameters that may affect the efficacy of the uplink signal from the first UE 202. The physical location of the first UE 202 and the access point 214 may be used to determine the distance of the UE 202 from the access point 214. As signal strength and/or signal quality generally degrades over distance, a particular uplink channel may be allocated disproportionately more power when the uplink signal has further to travel. The frequency of the uplink signal may also be used to determine how pathloss, multipath, or material attenuation may affect the first UE's ability to communicate with the access point 214. For uplink signals with higher frequencies that lack line of sight or are determined to have greater pathloss, for example, the power allocation module 220 may allocate disproportionately more power so that the signal may adequately reach the access point 214. Finally, in a high noise environment, a particular uplink signal may be disproportionately affected by interference and/or noise. Accordingly, it may be desirable for the power allocation module 220 to allocate disproportionately more power to the uplink channel experiencing higher SINR, in order for the uplink signal to adequately be communicated to the access point 214.

Whether the power allocation module 220 determines the per-channel maximum transmit power to be equally or unequally divided, once the power allocation determinations have been made, the power allocation module 220 may communicate one or more instructions to the first UE 202 to adjust the maximum transmit power of the granted channels. In some aspects, the power allocation module 220 may store the power allocation instructions or communicate the power allocation instructions to one or more network components of network 208 for use in future power allocation determinations, network monitoring, or for network planning purposes.

Figure 3:
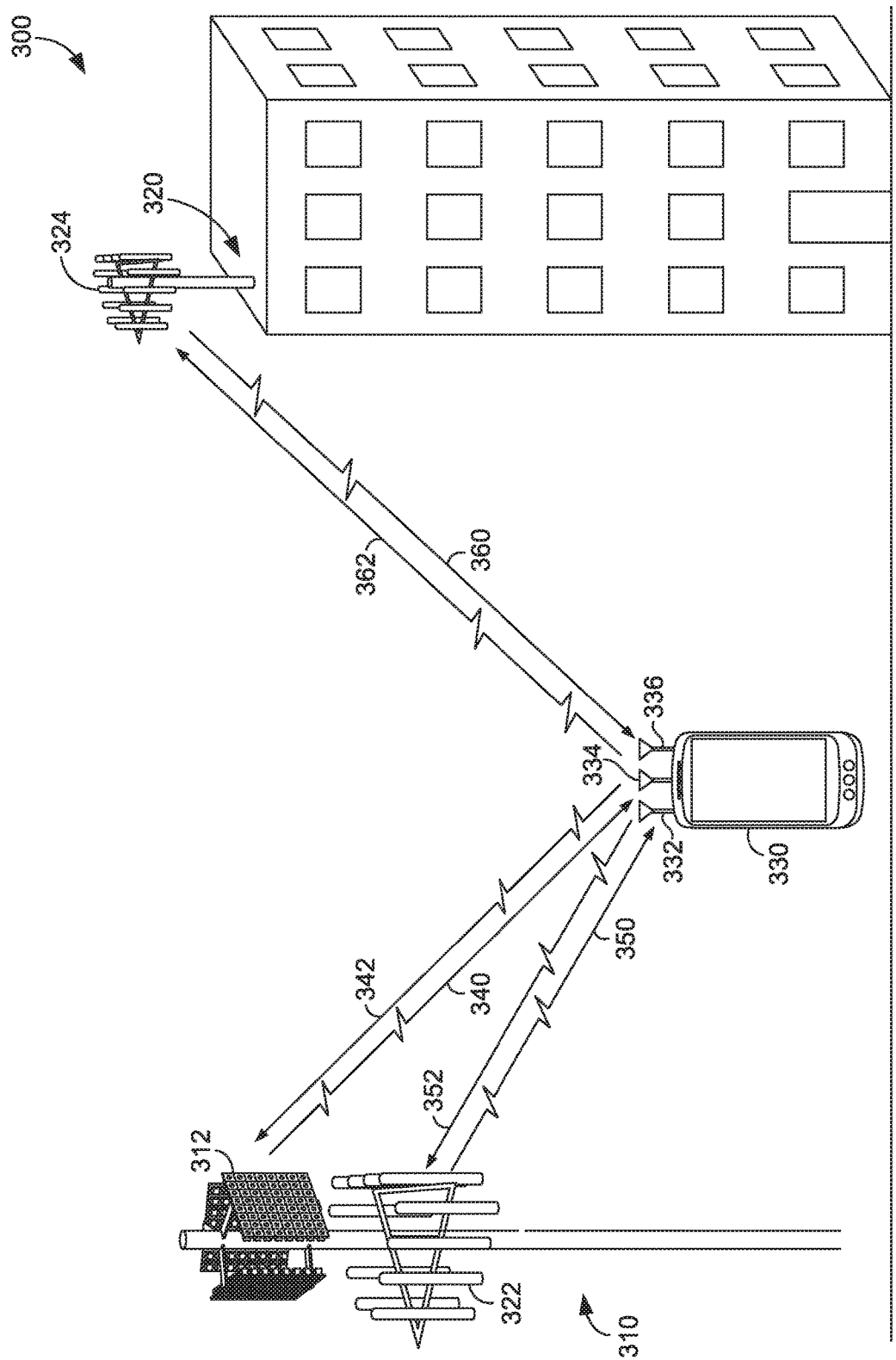
FIG. 3 depicts a representation of a plurality of access points capable of wirelessly communicating with a UE in accordance with aspects herein.

Turning now to FIG. 3, a representation of a system 300 comprises a first access point 312, a second access point 322, and a third access point 324, any one or more of which may wirelessly communicate with a UE 330 in accordance with aspects herein. The first access point 312, the second access point 322, the third access point 324, and the UE 330 are but one example of suitable configurations and are not intended to suggest any limitations as to the scope of use or functionality of embodiments described herein. Neither should the configuration be interpreted as having any dependency or requirement relating to any one or combination of components illustrated.

In the illustrated aspect, the first access point 312 is a 5G (NR) access point, and each of the second access point 322 and the third access point 324 are 4G (LTE) access points. That is, the first access point 312 may wirelessly communicate with the UE 330 via a 5G wireless communication protocol, and each of the second access point 322 and the third access point 324 may wirelessly communicate with the UE 330 via a 4G wireless communication protocol. In other aspects, the first access point 312 may be any of a first type of access point configured to wirelessly communicate with the UE 330 via a first wireless communication protocol, and each of the second access point 322 and the third access point 324 may be a second type of access point configured to wirelessly communicate with the UE 330 via a second wireless communication protocol. For example, the first access point 312 may be an eNodeB, capable of wirelessly communicating with the UE 330 via 4G or LTE communication protocols while each of the second access point 322 and the third access point 324 may be a gNodeB, capable of wirelessly communicating with the UE 330 via 5G. Any combination thereof is expressly conceived and the present disclosure is not limited to any one or more particular types of access points nor any one or more particular types of wireless communication protocols.

Though the first access point 312 is illustrated as being collocated with the second access point 322 both of which are located apart from the third access point 324, the geographic dispersions of the access points is not intended to be limited. It is specifically conceived that each of the first access point 312, the second access point 322, and the third access point 324 may be located physically located apart from one another. Further, though each of the first access point 312, the second access point 322, and the third access point 324 are illustrated as macro cells, any one or more of the first access point 312, the second access point 322, and the third access point 324 may be a macro cell, small cell, femto cell, or take the form of any other suitable wireless node between the UE 330 and a wireless network, such as the network 208 of FIG. 2.

Seen in FIG. 3, the first access point 312 may communicate a first wireless downlink signal 340 to the UE 330, and a first transmitter 332 of the UE 330 may communicate a first wireless uplink signal 342 to the first access point 312. The second access point 322 may communicate a second wireless downlink signal 350 to the UE 330, and a second transmitter 334 of the UE 330 may communicate a second wireless uplink signal 352 to the second access point 322. The third access point 324 may communicate a third downlink signal 360 to the UE 330, and a third transmitter 336 may communicate a third wireless uplink signal 362 to the third access point 324. Any one or more of the first access point 312, the second access point 322, and the third access point 324 may comprise and/or be coupled to (including communicatively coupled to) a processor, such as a server, database, computer, a combination of components such as the dynamic power allocation engine 212, a radio, a controller, or the like. In aspects, the processor may be configured to perform operations that comprise receiving one or more uplink channel grant requests from the UE 330. The processor may receive an indication, or determine itself, that the UE 330 is ENDC capable, that ENDC is not deconfigured on the UE 330, and a maximum total transmit power of the UE 330. In response, the processor may determine at least one uplink channel grant for the UE 330 to communicate in an ENDC session. In response to such a determination, the process or may allocate the maximum total transmit power of the UE 330 among the one or more uplink channels for which an uplink grant has been given and communicate the power allocations to the UE 330, causing the UE 330 to adjust one or more uplink-channel-specific maximum transmit power limits.

In an illustrative example, the first access point 312 is a 5G access point and each of the second access point 322 and the third access point 324 are 4G access points. The second access point 322 may further be considered to be a 4G Pcell and the third access point 324 may be considered to be a 4G Scell, vis-à-vis the UE 330. As an ENDC-configured device, an uplink grant has been requested for the UE 330 to communicate on each of the first uplink channel 342, the second uplink channel 352, and the third uplink channel 362. Having a jurisdictionally-imposed total maximum transmit power limit of 26 dBm, the standard ENDC configuration of the UE 330 allocates a 23 dBm transmit power limit for 5G (all of which is allocated to the first uplink channel 342), and a 23 dBm transmit power limit for 4G (which is further divided into a 20 dBm transmit power limit for each of the second uplink channel 352 (4G Pcell) and the third uplink channel 362 (4G Scell)). If the first uplink channel 342 is not granted to the UE 330, 23 dBm of power headroom exists and may be reallocated to increase the maximum transmit power limits of each of the second uplink channel 352 and the third uplink channel 362. If reallocated equally, each of the second uplink channel 352 and the third uplink channel 362 maximum transmit power limits would accordingly double, from 20 dBm to 23 dBm. If one of the second uplink channel 352 or the third uplink channel 362 is not granted to the UE 330, 20 dBm of power headroom exists and may be reallocated to increase the maximum transmit power of the 4G uplink channel that has been granted (i.e., if the third uplink channel 362 (4G Scell) is not granted, the maximum transmit power of the second uplink channel 352 (4G Pcell) would be increased). Accordingly, the granted 4G uplink channel may have its maximum transmit power limit increased from 20 dBm to 23 dBm. Finally, if both the second uplink channel 352 and the third uplink channel 362 are not granted to the UE 330, the only granted uplink channel is the 5G first uplink channel 342. Accordingly, 23 dBm of power headroom exists and may reallocated to increase the maximum transmit power limit of the first uplink channel 342 from 23 dBm to the full, total maximum transmit power limit of 26 dBm. These are but a few examples using a particular set of facts, and one skilled in the art would understand them to illustrate the solution and advantage of dynamically power headroom to modify channel-specific maximum transmit powers for uplink channels granted to a UE.

Figure 4:
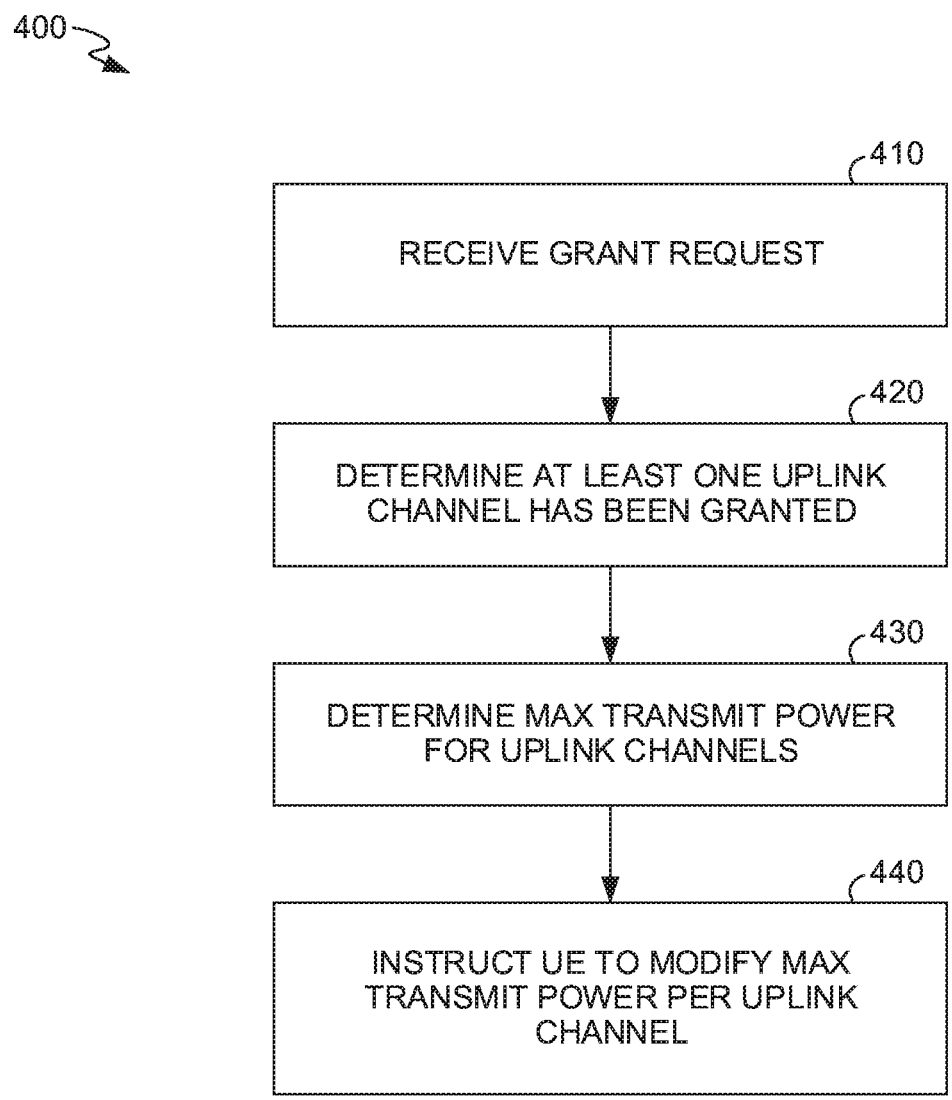
FIG. 4 depicts a flow diagram of an exemplary method for uplink channel power management by a wireless communication network, in accordance with aspects herein.

FIG. 4 depicts a flow diagram of an exemplary method 400 for instructing a user device to dynamically modify one or more maximum transmit power limits, in accordance with aspects of the present disclosure. At step 410, one or more uplink channel grant requests are received. For example, a particular UE may request an uplink channel grant on a 5G channel, a 4G Pcell channel, and a 4G Scell channel. At step 420, it is determined that a first set of the uplink channel grant requests has been granted. For example, each of a 5G uplink channel grant request and a 4G Pcell uplink channel grant request may be granted. In some aspects, step 420 may also comprise determining which uplink channel grant requests should be granted, based on any one or more network parameters. In another aspect, step 420 may comprise determining that a second set of the uplink channel grant requests have not been granted. As discussed in greater detail with respect to FIGS. 2 and 3, each of the first set of uplink channels and the second set of uplink channels may comprise as few as one uplink channel. At step 430, the maximum total transmit power of a user device is determined. For example, a network may comprise an indication, or may be informed by the user device itself, that the user device is limited to using 26 dBm of total power to communicate form the user device to the network. Finally, at step 440, the UE is instructed to modify at least one channel-specific maximum transmit power by allocating at least a portion of the power headroom to one or more of the first set of uplink channels, wherein the power headroom is created by the second set of uplink channel grant requests not being granted.

Figure 5:
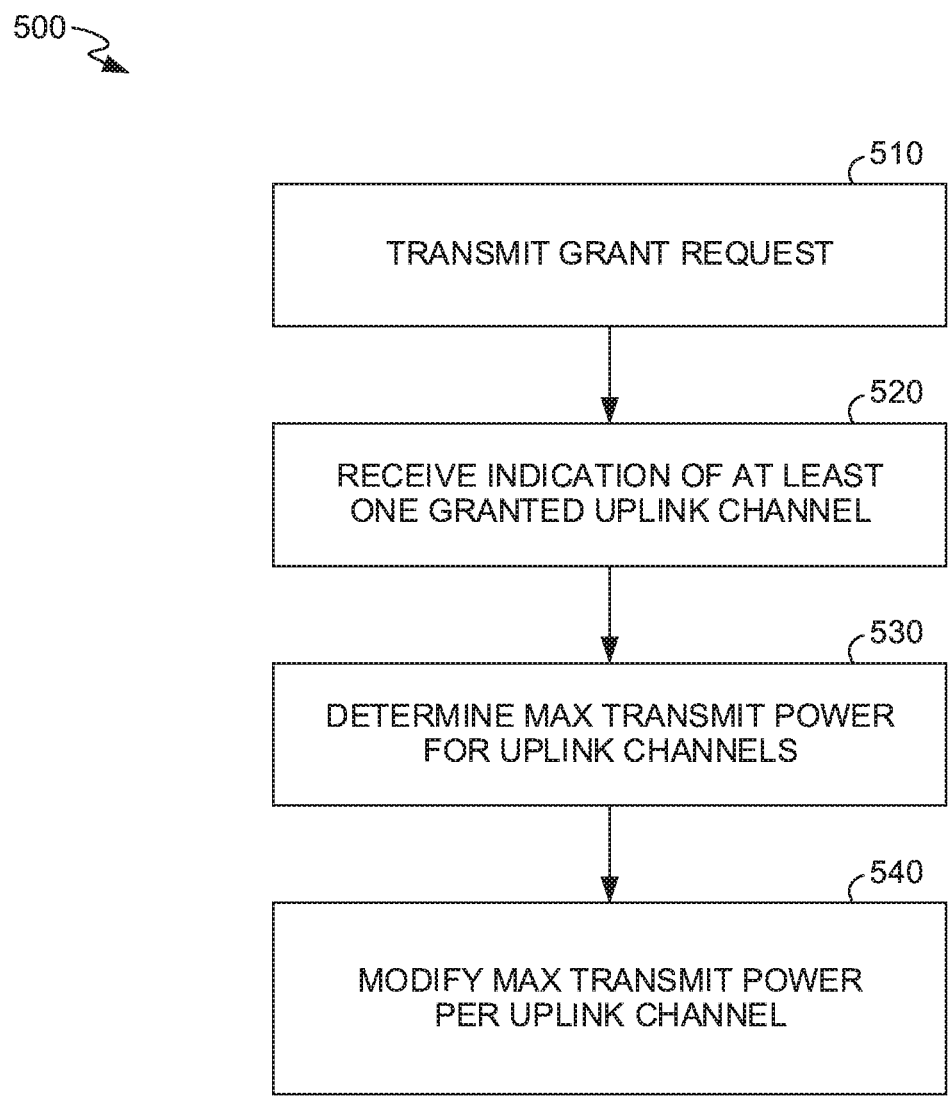
FIG. 5 depicts a flow diagram of an exemplary method for uplink channel power management by an ENDC-capable user device, in accordance with aspects herein.

FIG. 5 depicts a flow diagram of an exemplary method 500 for dynamically modifying one or more maximum transmit power limits, in accordance with aspects of the present disclosure. At step 510, one or more uplink channel grant requests are communicated from a UE to a wireless network. For example, the UE may request an uplink channel grant on a 5G channel, a 4G Pcell channel, and a 4G Scell channel. At step 520, the UE receives an indication that a first set of uplink channel grant requests have been granted, each of the first set of uplink channel grant requests specific to a particular uplink channel. For example, each of a 5G uplink channel grant request and a 4G Pcell uplink channel grant request may be granted, but a 4G Scell uplink channel grant request may not be granted. In some aspects, step 520 may comprise determining that a second set of the uplink channel grant requests have not been granted by the wireless network. At step 530, the UE determines its maximum total transmit power. For example, the user device may be limited to using 26 dBm of total power to communicate form the user device to the wireless network, based on device, jurisdictional, or network restrictions. Finally, at step 540, the UE modifies at least one channel-specific maximum transmit power by allocating at least a portion of the power headroom to one or more of the first set of uplink channels, wherein the power headroom is created by the second set of uplink channel grant requests not being granted Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for dynamically allocating maximum uplink power per channel in a user device, the system comprising:
   a plurality of access points, each of the plurality of access points capable of receiving a communication from the user device via a distinct uplink channel;
   a processor, the processor configured to perform operations comprising:
   determine that a first set of uplink channels has been granted to the user device;
   determine that a second set of uplink channels has not been granted to the user device;
   determine a maximum total transmit power of the user device, wherein a first amount of the maximum total transmit power is cumulatively allocated as a maximum transmit power of the first set of uplink channels, and wherein a second amount of the maximum total transmit power is cumulatively allocated as a maximum transmit power of the second set of uplink channels; and instruct the user device to increase the maximum transmit power of the first set of uplink channels by the second amount of the maximum total transmit power.

2. The system of claim 1, wherein the first set of uplink channels consist of a first uplink channel used by the user device to communicate with a first access point.

3. The system of claim 1, wherein the first set of uplink channels comprises a first uplink channel used by the user device to communicate with a first access point using a first wireless communication protocol and a second uplink channel used by the user device to communicate with a second access point.

4. The system of claim 3, wherein the user device is configured to communicate with the second access point using a second wireless communication protocol, via a second uplink channel.

5. The system of claim 4, wherein the first wireless communication protocol is different than the second wireless communication protocol.

6. The system of claim 4, wherein the first wireless communication protocol is the same as the second wireless communication protocol.

7. The system of claim 1, wherein the processor is additionally configured to instruct the user device to increase a maximum transmit power of a first uplink channel by a first portion of the second amount of the maximum total transmit power to the first uplink channel and increase a maximum transmit power of a second uplink channel by a second portion of the second amount of the maximum total transmit power to the second uplink channel.

8. The system of claim 7, wherein the first portion of the second amount of the maximum total transmit power is equal to the second portion of the second amount of the maximum total transmit power.

9. The system of claim 1, wherein the processor is additionally configured to determine that the user device is capable of communicating using dual connectivity.

10. A method for modifying one or more uplink channel power limits of a user device, the method comprising:
    determining that a first set of uplink channels have been granted to the user device;
    determining that a second set of uplink channels have not been granted to the user device;
    determine a maximum total transmit power of the user device, wherein a first amount of the maximum total transmit power is cumulatively allocated as a maximum transmit power of the first set of uplink channels, and wherein a second amount of the maximum total transmit power is cumulatively allocated as a maximum transmit power of the second set of uplink channels; and
    instruct the user device, using one or more instruction signals transmitted from an access point to the user device, to increase the maximum transmit power of the first set of uplink channels by the second amount of the maximum total transmit power.

11. The method of claim 10, wherein the first set of uplink channels comprises a first uplink channel and a second uplink channel, and wherein the user device is instructed to increase a maximum transmit power of a first uplink channel by a first portion of the second amount of the maximum total transmit power and to increase a maximum transmit power of a second uplink channel by a second portion of the second amount of the maximum total transmit power.

12. The method of claim 11 wherein each of the first uplink channel and the second uplink channel is configured for communicating between the user device and a network according to a first communication protocol and the second set of uplink channels comprises one or more uplink channels configured for communicating between the user device and the network according to a second communication protocol, the first communication protocol being different than the second communication protocol, and wherein the first portion of the second amount of the maximum total transmit power is equal to the second portion of the second amount of the maximum total transmit power.

13. The method of claim 11 wherein the first uplink channel is configured for communicating between the user device and a network according to a first communication protocol and the second uplink channel is configured for communicating between the user device and the network according to a second communication protocol, the first communication protocol being different than the second communication protocol.

14. The method of claim 13, wherein the second set of uplink channels are configured for communicating between the user device and the network according to the first communication protocol and wherein the first portion of the second amount of the maximum total transmit power is equal to the second amount of the maximum total transmit power and the second portion of the second amount of the maximum total transmit power is zero.

15. The method of claim 11, wherein the first portion of the second amount of the maximum total transmit power is not equal to the second portion of the second amount of the maximum total transmit power and wherein at least one of the first portion of the second amount of the maximum total transmit power and the second portion of the second amount of the maximum total transmit power is determined based on one or more network parameters.

16. The method of claim 11, wherein the first set of uplink channels consists of a first uplink channel configured for communicating between the user device and a network according to a first communication protocol and the first amount of the maximum total transmit power is equal to the second amount of the maximum total transmit power.

17. The method of claim 10, wherein the method further comprises receiving one or more uplink channel grant requests from the user device.

18. A method for modifying one or more uplink channel power limits of a user device, the method comprising:
    receiving an indication from a wireless network that a first set of uplink channels have been granted to the user device;
    determining a maximum total transmit power of the user device, wherein a first amount of the maximum total transmit power is cumulatively allocated as a maximum transmit power of the first set of uplink channels, and wherein a second amount of the maximum total transmit power is cumulatively allocated as a maximum transmit power of a second set of uplink channels; and
    transmitting, from the user device to a wireless access point, a wireless signal using an amount of power comprising the first amount of the maximum total transmit power and the second amount of the maximum total transmit power.

19. The method of claim 18, wherein the method further comprises determining that a second set of uplink channels have not been granted to the user device.

20. The method of claim 18, wherein the first amount comprises a maximum transmit power for communicating according to a first protocol and the second amount comprises a maximum transmit power for communicating according to a second protocol.

* * * * *